UNITED STATES PATENT OFFICE.

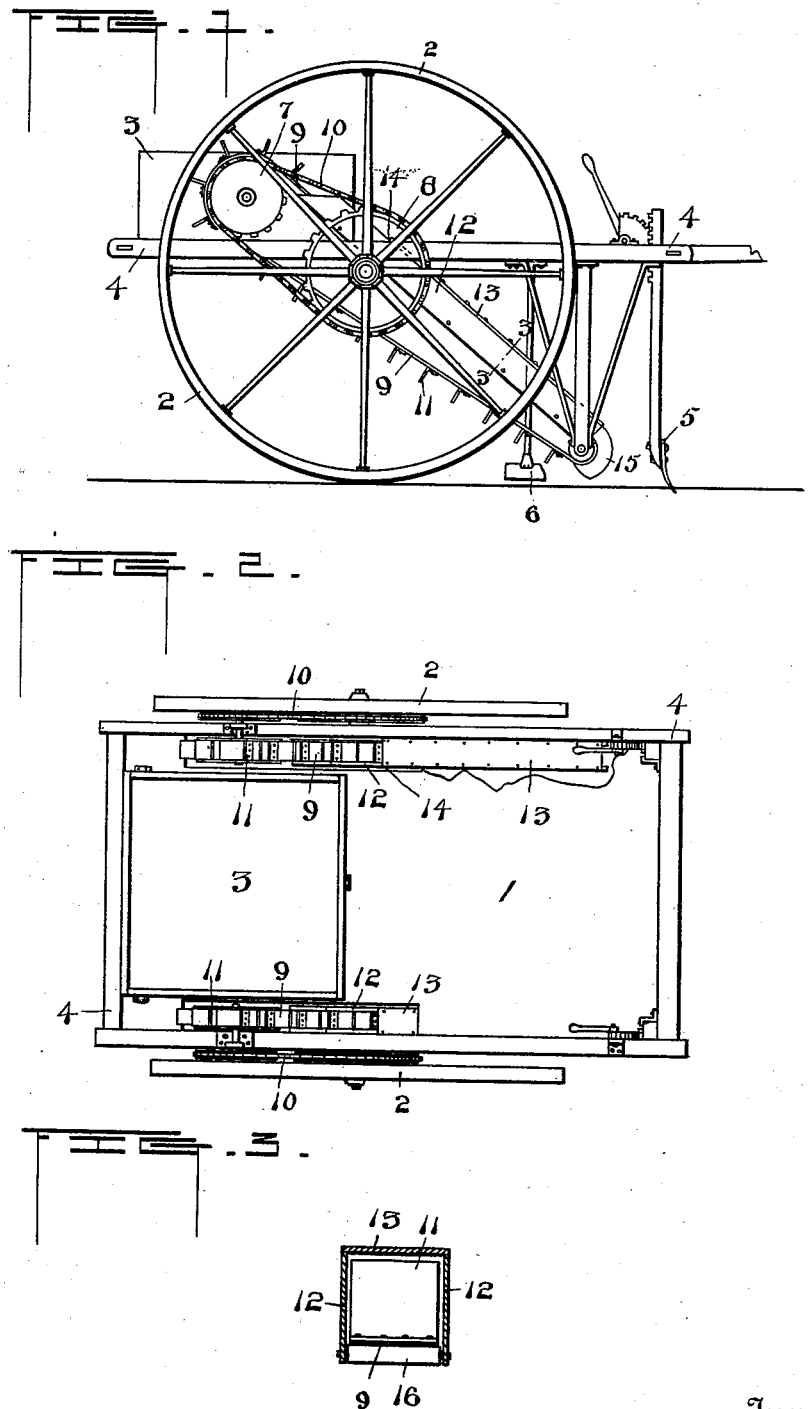

ALVIN GEORGE GEKELER, OF FROSTBURG, MARYLAND.

POTATO-PLANTER.

SPECIFICATION forming part of Letters Patent No. 507,428, dated October 24, 1893.

Application filed February 28, 1893. Serial No. 464,017. (No model.)

*To all whom it may concern:*

Be it known that I, ALVIN GEORGE GEKELER, a resident of Frostburg, in the county of Allegany and State of Maryland, have invented certain new and useful Improvements in Potato-Planters; and I do hereby declare the following to be a full, clear, and exact description of the invention, such as will enable others skilled in the art to which it pertains to make and use the same.

The invention is an improvement on that described in Patent No. 490,555, issued to me the 24th of January, 1893, for a potato-planter and has for its objects to secure greater certainty in the delivery of the seed in the furrow, obviate the accidental throwing out of potatoes or pieces from the carrier pockets and avoid unnecessary friction on the belt which carries said pockets; and it consists in the constructions herein described and particularly pointed out.

In the accompanying drawings Figure 1 is a side elevation. Fig. 2 is a top plan; and Fig. 3 is a section of the carrier and its cover taken on line 3—3 of Fig. 1.

Numeral 1 denotes a cart body consisting in the present instance of a frame 4 provided with a floor.

2 denotes cart wheels.

3 indicates a seed receptacle which may be placed upon the floor of the body or if preferred the latter may have a box of usual form in which case a special seed holding receptacle may be used or not as desired.

5 indicates a vertically adjustable shovel, there being one on each side of the cart.

6 denotes approximately vertical covering blades adapted to run in the fresh earth turned up into ridges by the shovel. Said blades are suitably inclined toward each other at their rear part whereby they are adapted to throw the loose earth over the seed dropped immediately behind the shovel.

7 and 8 denote sprocket wheels or their equivalents for suitably moving a belt 9 of canvas or other flexible material. Said wheels are connected to run together by a sprocket chain 10 and the belt 9 runs on a pulley fixed on a shaft with sprocket wheel 7. This belt at its lower end runs about a pulley or roller supported in suitable hangers in the rear of and close to the shovel and about at the level of the ground.

11 indicates plates bent at right angles and having one wing secured to the belt.

12 denotes boards or plates preferably of wood supported from the cart body and inclosing the belt at its sides and 13 is a cover secured to the side boards and extending from the lower belt pulley to about the point 14 near the level of the cart axle.

15 is a longitudinal curved tube open on its inner side and forming a continuation of the tube or conduit produced by the side boards 12 and cover 13. The front and exterior of the tube or chute 15 are backwardly curved at its bottom which is situated near or a little below the summit of the ridges formed by the shovel. This form prevents the chute acting as a scoop and collecting earth that may have rolled back into the furrow.

16 denotes rollers having their axes suitably journaled near the lower edges of the side boards. These rollers are adapted to support the carrier belt and prevent excessive sagging. Four or five seed pockets inclosed by the belt, bent plates and side boards are always in sight and open above to permit good seed to be substituted for bad if such has been accidentally placed therein or to permit seed to be substituted if any has been accidentally thrown out as may happen on rough or uneven ground. Seed carried by the movement of the belt below the point 14 is securely inclosed on all sides until it is dropped in the furrow. It is also supported until it reaches about the level of the ground and falls but a slight distance.

The invention is limited to no particular dimensions or material. Canvas is however preferred for the belt and metal for the seed holding plates. These are about three inches long and preferably a little less than that in height. The conduit formed by the side and covering boards should have a cross section sufficiently large to permit free passage of the belt and plates. The main body of the belt conduit is preferably made of light boards and the curved extension of the conduit of sheet metal.

I am aware that an endless belt has been combined with a covered box the whole being adapted to elevate ears of corn; also that inclosed endless belts have been proposed for raising seed from a hopper and dropping it through a chute from a position above or near said hopper and such constructions are not of my improvement.

It is characteristic of my improvement that the seed can be deposited in pockets open to inspection and for the supply or substitution of good seed, if required, for a short distance, and that the seed then passes into a covered way which extends in a downwardly inclined direction to a point below or near the top of the ridges produced by the shovel, the pockets being formed on an endless belt the upper half of which is supported in an inclined position upon rollers. The lower end of this covered way is backwardly inclined to pass over clods or other accidental obstructions left in the furrow. Its proximity to the bottom of the furrow insures that the seed shall fall therein under all circumstances as when planting on rough ground on the side of a hill.

Having thus fully described my invention, what I claim is—

1. In a planting machine and in combination a cart, an endless belt provided with seed holding devices, the side boards, and the top covering-board, said side boards inclosing the belt at its edges and extending from near the ground to a point above the cart body floor and the top extending from the same point to near the plane of said floor, and mechanism adapted to move the upper part of the belt toward the ground by the forward movement of the cart substantially as set forth.

2. In a planting machine and in combination an endless seed carrier belt, a straight downwardly inclined inclosing conduit for said belt, and an extension of said conduit reaching to about the level of the ground and curved about the lower belt guiding roller to reduce to a minimum the falling distance for the seed, and mechanism adapted to move the upper part of the belt toward the ground by the forward movement of the cart substantially as set forth.

3. In a planting machine and in combination the endless belt, the angular plates attached to said belt, the side boards, the friction rollers journaled in the side boards, the covering for the side boards extending from the lower belt roller to about the level of the body, and the extension of the belt conduit formed by the side and covering boards said extension being made of metal and curved about the lower belt supporting roller, and mechanism adapted to move the upper part of the belt toward the ground by the forward movement of the cart all substantially as set forth.

In testimony whereof I have signed this specification in the presence of two subscribing witnesses.

ALVIN GEORGE GEKELER.

Witnesses:
THOS. G. PORTER,
L. F. HARBAUGH.